Figure 1:
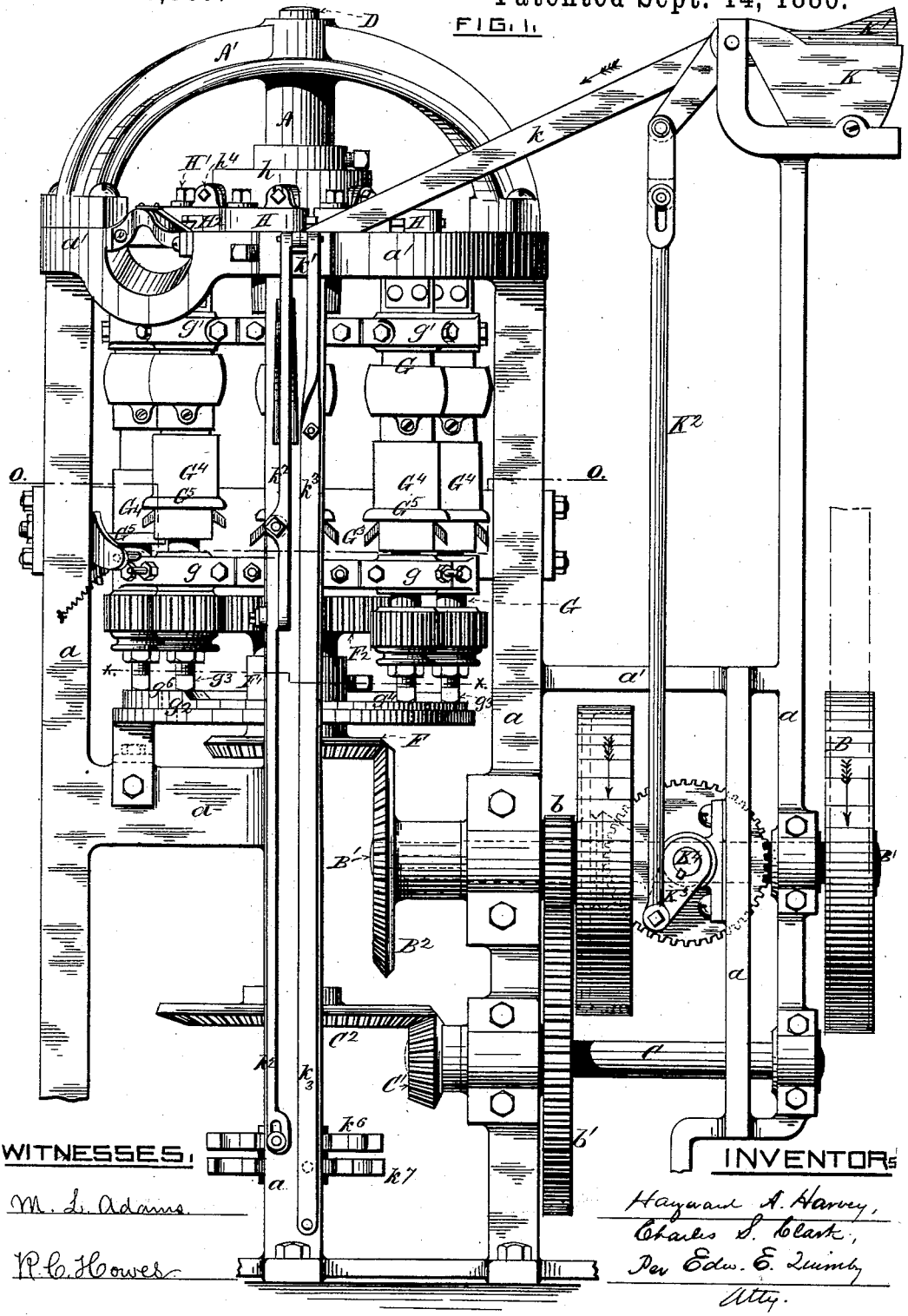

(No Model.)  5 Sheets—Sheet 1.

H. A. HARVEY & C. S. CLARK.
MULTIPLE SCREW SHAVING MACHINE.

No. 348,967.  Patented Sept. 14, 1886.

WITNESSES:
M. L. Adams.
R. C. Howes.

INVENTORS
Hayward A. Harvey,
Charles S. Clark,
Per Edw. E. Quimby
Atty.

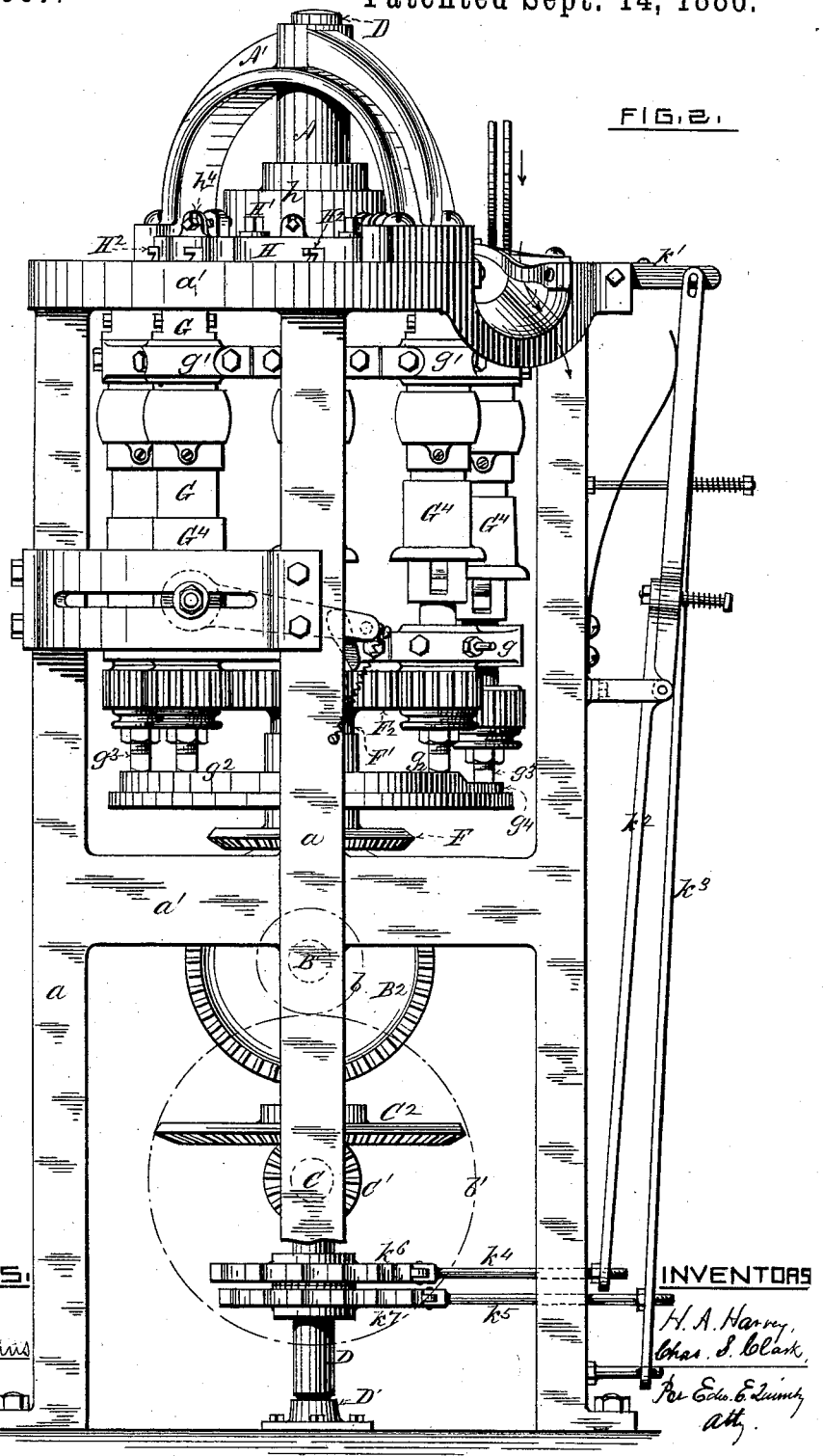

(No Model.)
H. A. HARVEY & C. S. CLARK.
MULTIPLE SCREW SHAVING MACHINE.
No. 348,967. Patented Sept. 14, 1886.
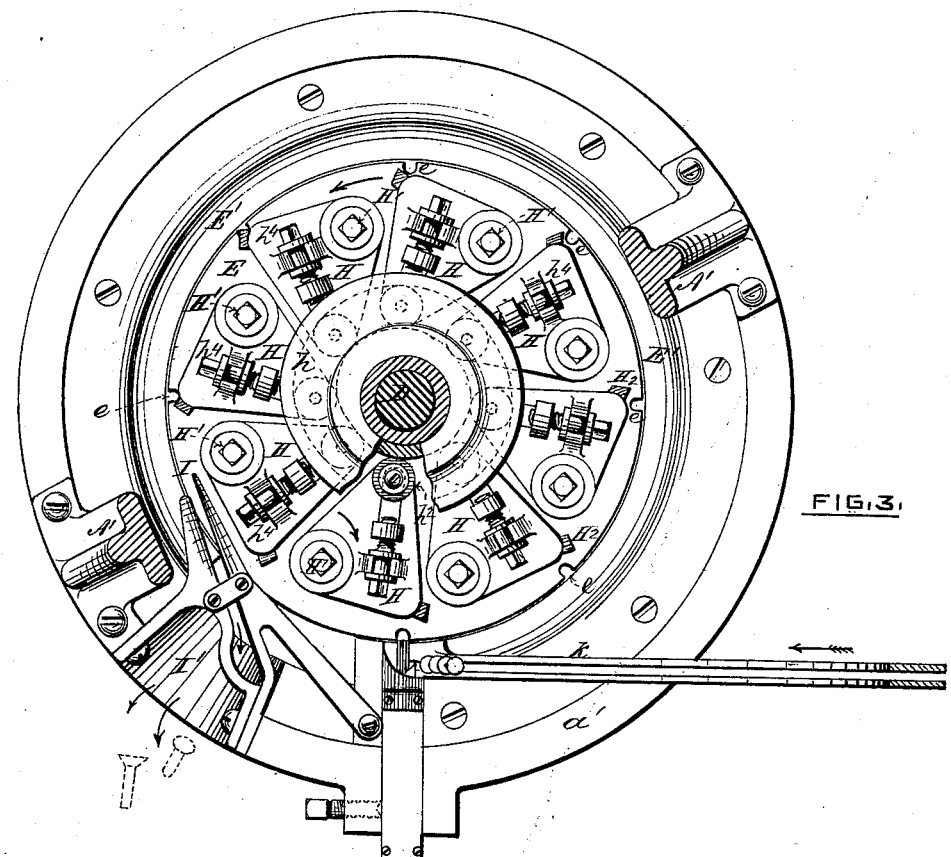
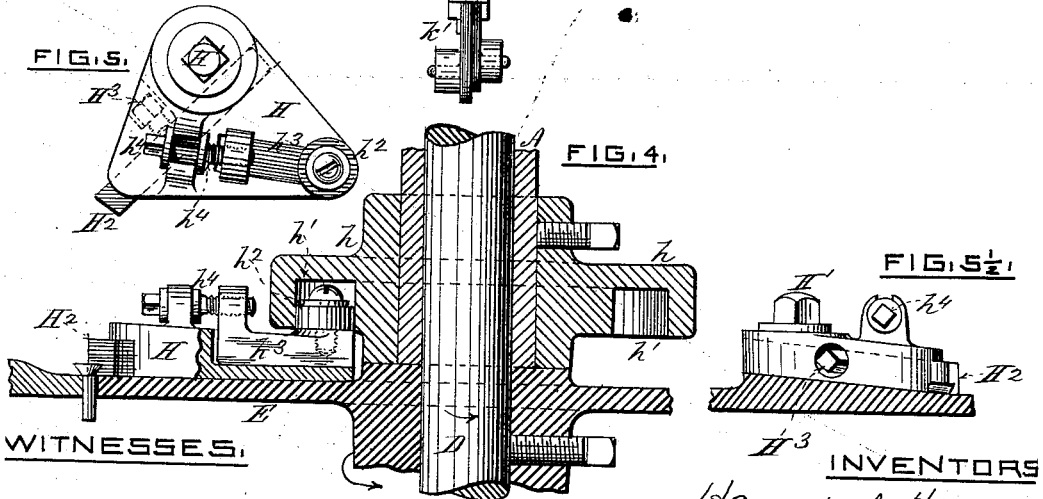
WITNESSES,
M. L. Adams
R. C. Howes
INVENTORS
Hayward A. Harvey,
Charles S. Clark.
Per Edw. E. Quimby,
Atty.

(No Model.) 5 Sheets—Sheet 4.

H. A. HARVEY & C. S. CLARK.
MULTIPLE SCREW SHAVING MACHINE.

No. 348,967. Patented Sept. 14, 1886.

WITNESSES:
M. L. Adams
R. C. Howes

INVENTORS
Hayward A. Harvey,
Charles S. Clark,
Per Edw. E. Lumby
Atty.

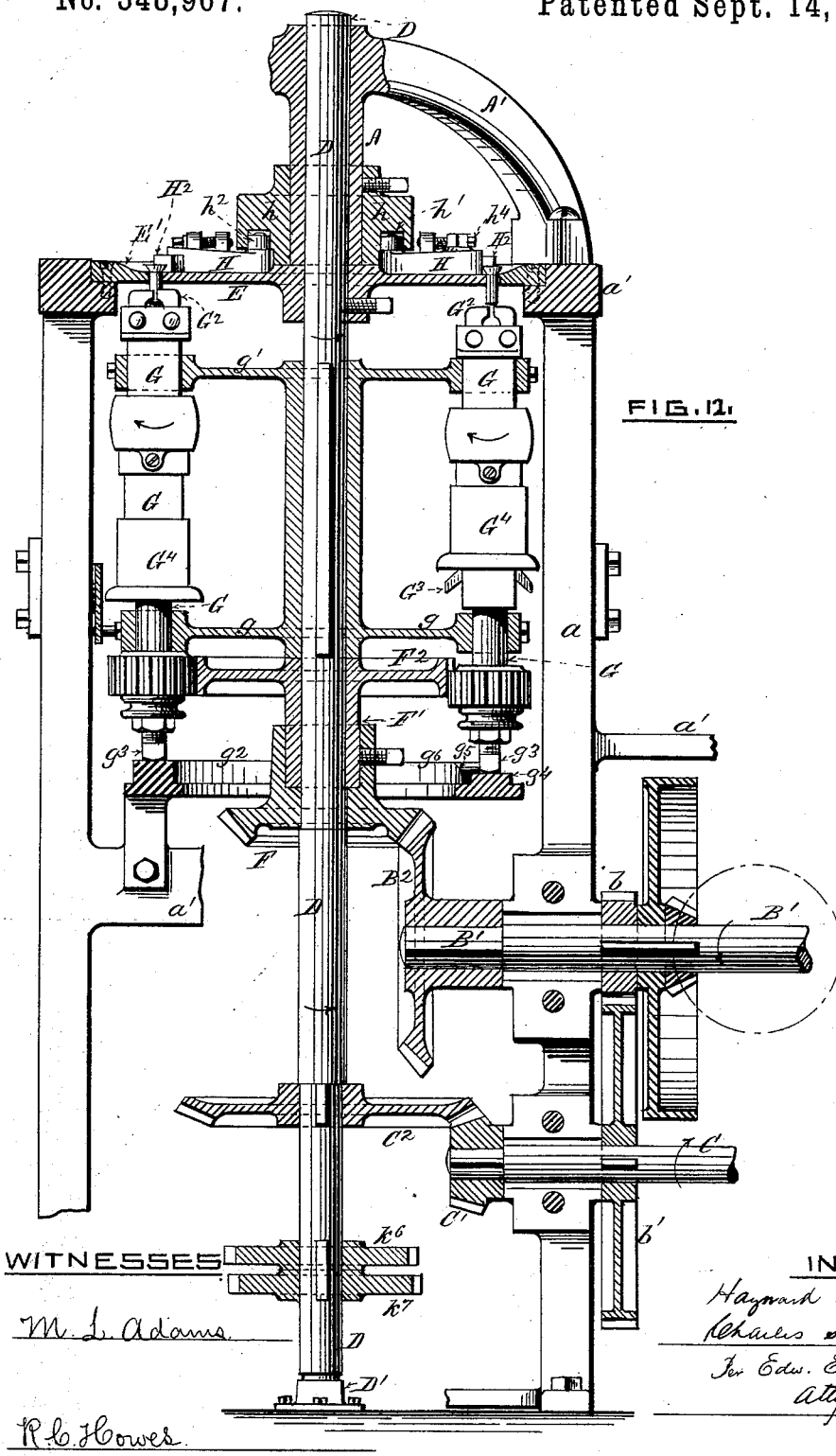

UNITED STATES PATENT OFFICE.

HAYWARD A. HARVEY, OF ORANGE, NEW JERSEY, AND CHARLES S. CLARK, OF PROVIDENCE, RHODE ISLAND, ASSIGNORS, BY MESNE ASSIGNMENTS, TO THE AMERICAN SCREW COMPANY, OF PROVIDENCE, RHODE ISLAND.

MULTIPLE SCREW-SHAVING MACHINE.

SPECIFICATION forming part of Letters Patent No. 348,967, dated September 14, 1886.

Application filed March 12, 1884. Serial No. 123,855. (No model.)

*To all whom it may concern:*

Be it known that we, HAYWARD A. HARVEY, of Orange, New Jersey, and CHARLES S. CLARK, of Providence, Rhode Island, have invented a certain Improvement in Multiple Screw-Shaving Machines, of which the following is a specification.

Our improvements relate to the type of screw-machines in which the blanks while being operated upon are moved bodily in a circular path by means of a rotating carrying-wheel, in which they are sustained in such positions that their longitudinal axes are parallel with the axis of rotation of the carrying-wheel.

Our present invention consists in providing the rotating carrying-wheel with a series of tools for shaving the heads of screw-blanks, mounted in tool-holders pivoted to the carrying-wheel, and provided with cam-pins engaging a groove in a stationary cam, by means of which, as the carrying-wheel rotates, the tool-holders are so oscillated upon their pivots as to feed the tools respectively against the heads of the blanks, while the blanks are being rotated upon their own longitudinal axes, by means of a system of rotating spindles mounted upon and partaking of the rotatory motion of the carrying-wheel, and provided with jaws for gripping the shanks of the blanks, and made to rotate upon their own longitudinal axes, respectively, by means of suitable gearing.

Our carrying-wheel may be arranged to rotate either upon a vertical or a horizontal axis, the selection of feeding devices for feeding the blanks successively to the carrying-wheel being varied accordingly. The blanks may be sustained in the carrying-wheel in holes extending transversely through the carrying-wheel in longitudinal alignment with the rotating spindles, in which case there will be employed feeding mechanism of the class which feeds blanks by an endwise movement into the carrying-wheel, the blanks being discharged therefrom by an endwise movement in the reverse direction; or the blanks may be fed into grooves extending transversely across the periphery of the carrying-wheel, in which case a stationary guard partially surrounding the carrying-wheel serves to hold the blanks in the grooves during that part of their orbital motion in the course of which they are being operated upon. The latter form is that which we have adopted for illustrating our invention in the present case in a multiple screw-shaving machine in which the carrying-wheel rotates upon a vertical axis.

Figure 6:
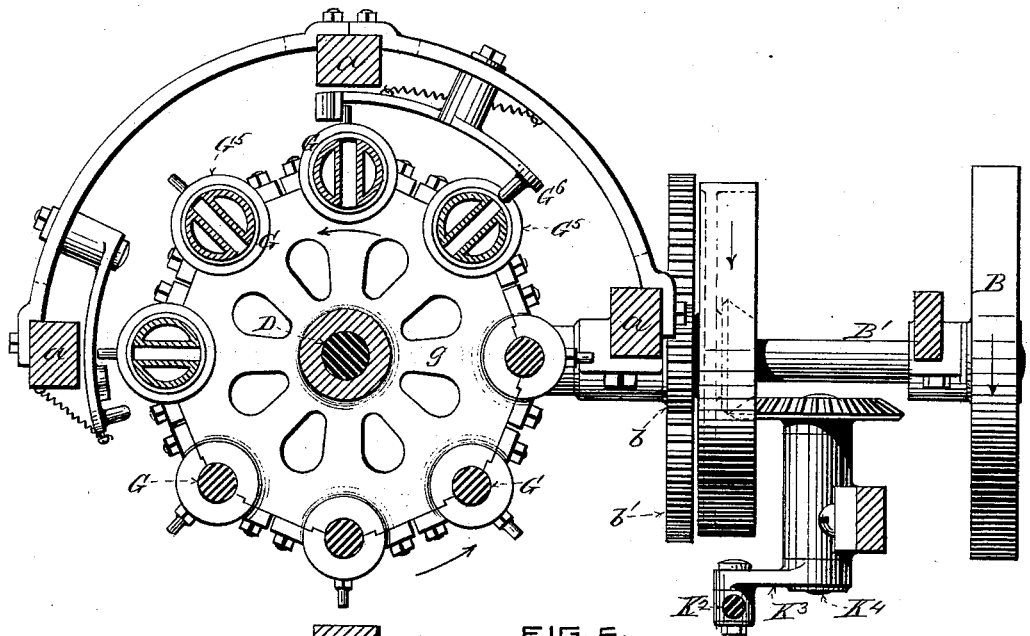
Figure 11:
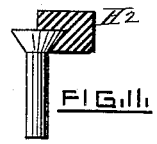
Figure 10:
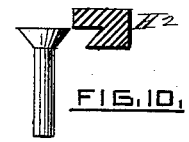
Figure 9:
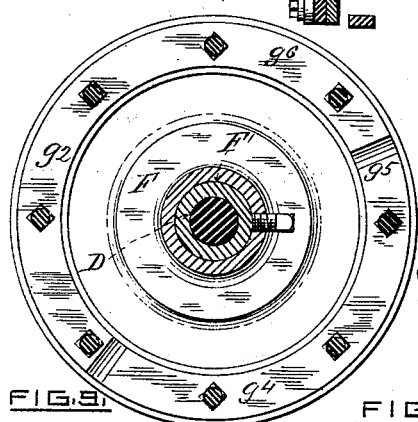
Figures 7, 8:
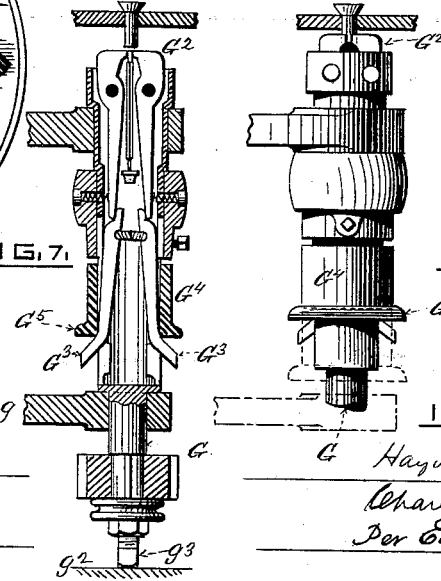

The drawings are as follows: Figure 1 is a front elevation of the machine, showing the hopper and the ways for conducting the screw-blanks from the hopper to the check by which they are successively delivered to the carrying-wheel. Fig. 2 is an elevation of the side of the machine opposite to that adjacent to which the hopper is located. Fig. 3 is a top view of the machine, partly in section. Fig. 4 is a central vertical section of the cam for governing the feed of the tool-holders, showing a portion of the stationary hollow boss to which the cam is secured, a portion of the carrying-wheel, and the vertical shaft to which the carrying-wheel is secured; also showing one of the tool-holders and a portion of the exterior shield which partly surrounds the carrying-wheel. Fig. 5 is a top view of one of the tool-holders, and Fig. 5½ is an elevation thereof. Fig. 6 is a horizontal section taken through the offset dotted line *o o* on Fig. 1. Fig. 7 is a central vertical section of one of the revolving spindles in its lower position immediately beneath a section of the carrying-wheel, in which a blank is deposited, the jaws being represented as open. Fig. 8 is an elevation of a part of the revolving spindle, showing it in its higher position with jaws gripped upon the shank of the blank hanging down from the carrying-wheel. Fig. 9 is a top view of the stationary cam, upon which the lower ends of the revolving spindles rest, the parts in section being taken through the line X X on Fig. 1. Fig. 10 is an elevation of a screw-blank and a section of the shaving-tool detached from the blank. Fig. 11 is an elevation of the blank, showing the shaving-tool in the potion which it acquires at the close of the shaving operation. Fig. 12 is a central vertical section of the machine.

The frame of the machine consists of a suitable number of upright members, a, united by horizontal members a'.

The machine is driven by a belt applied to the pulley B, affixed to the prime shaft B'. Power is transmitted from the prime shaft by means of the small pinion b and gear b', to the counter-shaft C, provided upon its inner end with the bevel-pinion C', which meshes with the bevel-wheel C², affixed to the shaft D of the carrying-wheel E. A bevel-wheel, B², upon the inner end of the prime shaft B', engages the bevel-wheel F, affixed to the hub F' of the gear F², which is loosely mounted upon the carrying-wheel shaft D. By this organization of gearing the carrying-wheel shaft is turned in one direction and the gear F² in the opposite direction. The gear F² engages the pinions upon the spindles by which the blanks are rotated upon their longitudinal axes. In the machine represented in the drawings eight of these spindles are shown. They are of the ordinary description, each consisting of a vertical shaft, G, to which is affixed a pinion for engagement by the gear F². Each spindle has two bearings, the lower one in the disk g and the upper one in the disk g', which are affixed to and rotate with the carrying-wheel shaft D, so that the spindles are preserved in vertical alignment with the blanks in the carrying-wheel. Each spindle is provided with the usual pivoted jaws, G², and the jaws are made to close upon and grasp the shanks of the blanks by the usual levers, G³, the tails of which are bent outward and project through slots in the hollow part of the spindles.

For operating the levers to close the jaws upon the blank, the usual movable sleeve, G⁴, is employed. This sleeve is provided with the usual projecting flange, G⁵. At the proper time during the rotation of the carrying-wheel, after the feeding operation has taken place, the flanges G⁵ of the sleeves G are successively carried under the pusher G⁶, by which the sleeves are pushed down, thus wedging the ends of the crooked levers G³ inward, and spreading the tails of the jaws G², and causing the jaws to grip the shank of the blank which has been fed into the carrying-wheel immediately over the spindle, and by this grip the blank is made to rotate upon its own axis as the spindle rotates.

The spindles G are capable of an endwise reciprocating motion, and their vertical position is governed by the stationary cam g², upon the face of which the lower ends, g³, of the spindles bear. While the feeding operation is going on, the spindle immediately under the holder into which the blank is being fed is traveling upon the lower part, g⁴, of the stationary cam. The jaws are then open. As the carrying-wheel rotates, the spindle travels up the incline g⁵ to the higher part g⁶ of the cam, thus carrying upward the jaws, so that they partially inclose the shank of the blank. Having reached this position, the sleeves G⁴ are pressed down, thus closing the jaws upon the blank and causing it to rotate, as described. While the blanks are thus being rotated upon their longitudinal axes, and at the same time being carried around by the carrying-wheel, their heads are presented to the action of shaving-tools mounted upon and rotating with the carrying-wheel. There being eight spindles in the machine, eight shaving-tools are employed.

The shaving mechanisms each consists of a tool-holder, H, which oscillates upon the pivot H', secured to the face of the carrying-wheel. The tool H² is seated in a groove formed in the tool-holder H, and is secured therein by means of the set-screw H³. The proper oscillation of the tool-holders, and the consequent feed of the shaving-tools against the heads of the blanks, is governed by the stationary cam h, which is affixed to the hollow boss A, in which the carrying-wheel shaft D has its upper bearing. The boss A is cast in one with the yoke A', which is bolted to the upper horizontal member, a', of the frame. The cam h has upon its under face an eccentric groove, h'. Each tool-holder is provided with a vertical cam-pin supporting an anti-friction roller, h², which is engaged by the cam-groove h'. The cam-pin is inserted in the slide h³. The slide h³ is seated in a groove formed in the top of the tool-holder, and is capable of endwise adjustment in its seat by the operation of the adjusting screw h⁴, by means of which the tool-holder is adjusted toward or from the cam h. The effect of the endwise movement of the slide h³ is to oscillate the tool-holder H upon its pivot H'; and by the adjustment of the slide h³, therefore, the tool is properly adjusted with relation to the head of the blank which it is to operate upon.

The shaving operation is performed upon the heads of the blanks as they are carried around with the carrying-wheel, and when it is completed the tools are successively rocked inward, clearing them from the heads of the shaved blanks by the flattened part of the cam-groove h'. As the carrying-wheel continues to rotate, the shaved blank is brought against the stripper I, by which it is detached from the carrying-wheel and dropped into the chute I'.

The blanks are fed successively into the grooves e, formed transversely across the periphery of the carrying-wheel E, and are held in these grooves while they are being carried sidewise in a circular path by means of the stationary guard E', which partially surrounds the carrying-wheel.

The feeding mechanism represented in the drawings is of a kind which we have described and claimed in another application and does not need elaborate description herein. It consists of the usual hopper, K, containing the usual lifter, K', which is oscillated by means of the pitman K², connected with the crank K³, affixed to the short counter-shaft K⁴, driven by bevel-gearing from the prime shaft B'. The blanks hanging by their heads slide down the ways $k$, and are successively fed to the carrying-wheel by the checking mechanism $k'$, operated by means of the levers $k^2$ and $k^3$, connected, respectively, with the reciprocating sliding rods $k^4$ and $k^5$, the ends of which are provided with rollers bearing, respectively, upon the peripheries of the cams $k^6$ and $k^7$, affixed to the lower part of the carrying-wheel shaft D.

The lower part of the carrying-wheel shaft D has its bearing in a block, D', affixed to the bed of the machine. In this instance, as the revolving spindles are vertical, their own weight keeps them down upon the stationary cam.

If desired, the machine can be elongated, and expanding spiral springs may be introduced between suitable collars upon the spindles and one of the disks in which the spindles have their bearings. By the employment of such springs the spindles may be constantly forced against the stationary cam when the carrying-wheel and the spindles are arranged to rotate upon horizontal axes.

We claim as our invention—

1. In a multiple screw-shaving machine, a rotating carrying-wheel adapted to receive and carry a series of screw-blanks sidewise in a circular path, a series of shaving-tools secured in holders pivoted to the said carrying-wheel, and a stationary cam for governing the feeding motions of the shaving-tools, in combination with a series of spindles partaking of the motion of the carrying-wheel and provided with jaws for grasping the shanks of the blanks sustained in the carrying-wheel, and the means, substantially such as described, for rotating the spindles upon their longitudinal axes, and thereby rotating the blanks during the performance of the shaving operation.

2. A carrying-wheel adapted to carry a series of blanks sidewise in a circular path and a system of spindles rotating upon their longitudinal axes, and also partaking of the rotatory movement of the carrying-wheel, in combination with a series of shaving-tools supported upon the carrying-wheel and means for feeding the tools against the heads of the blanks, and a cam for controlling the positions of the spindles relatively to the carrying-wheel during the successive feeding and shaving operations.

3. The combination of a rotating carrying-wheel for carrying a series of screw-blanks sidewise in a circular path, a series of shaving-tools mounted upon the carrying-wheel, a cam for governing the feeding motions of the shaving-tools, and a system of spindles rotating upon axes parallel with the axis of the carrying-wheel, each spindle provided with jaws for gripping the shanks of the blanks carried by the carrying-wheel, and a cam for imparting appropriate endwise movements to the spindles, and thereby causing the jaws of the spindles to successively close upon the shanks of the blanks and remain closed upon them during that part of the sidewise motions of the blanks in the course of which they are being subjected to the shaving operation, and to unclose from the blanks and permit them to be discharged after the shaving operations are successively completed.

H. A. HARVEY.
CHARLES S. CLARK.

Witnesses:
W. H. THURSTON,
E. P. ALLEN.